(12) United States Patent
Kawano

(10) Patent No.: US 11,286,165 B2
(45) Date of Patent: Mar. 29, 2022

(54) METHOD FOR MANUFACTURING ARTIFICIAL GRAPHITE ELECTRODE

(71) Applicant: NIPPON STEEL CHEMICAL & MATERIAL CO., LTD., Tokyo (JP)

(72) Inventor: Yoichi Kawano, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 37 days.

(21) Appl. No.: 16/084,515

(22) PCT Filed: Mar. 16, 2017

(86) PCT No.: PCT/JP2017/010573
§ 371 (c)(1),
(2) Date: Sep. 12, 2018

(87) PCT Pub. No.: WO2017/159769
PCT Pub. Date: Sep. 21, 2017

(65) Prior Publication Data
US 2019/0039909 A1  Feb. 7, 2019

(30) Foreign Application Priority Data

Mar. 17, 2016 (JP) .............................. JP2016-053501
Sep. 7, 2016 (JP) .............................. JP2016-174571

(51) Int. Cl.
*C01B 32/205* (2017.01)
*C04B 35/532* (2006.01)
(Continued)

(52) U.S. Cl.
CPC .............. *C01B 32/205* (2017.08); *B28B 3/20* (2013.01); *C04B 35/532* (2013.01); *C04B 40/0032* (2013.01); *C21B 13/12* (2013.01)

(58) Field of Classification Search
None
See application file for complete search history.

(56) References Cited

U.S. PATENT DOCUMENTS 3,856,926 A     12/1974  Yamaura et al.
5,900,189 A *    5/1999  Kawano .................. H01M 4/96
                                                        252/502
(Continued)

FOREIGN PATENT DOCUMENTS

CN      103030404 A    4/2013
CN      105272254 A    1/2016
(Continued)

OTHER PUBLICATIONS

JPH0528998 (Jinichi) Feb. 1993 (online machine translation), [Retrieved on Feb. 24, 2020]. Retrieved from: Espacenet (Year: 1993).*
(Continued)

*Primary Examiner* — Kelly M Gambetta
*Assistant Examiner* — Andrés E. Behrens, Jr.
(74) *Attorney, Agent, or Firm* — Locke Lord LLP

(57) ABSTRACT

The present invention provides a method for producing an artificial graphite electrode that enables kneading and subsequent mixing to be carried out without having to increase an amount of binder pitch used even in the case of needle coke having a large pore volume. An artificial graphite electrode is produced by kneading binder pitch with needle coke, and performing extrusion molding and then performing baking and graphitization process on the same, wherein a process for kneading the binder pitch with needle coke includes at least two separate kneading stages, and the amount of binder pitch added and kneading time in these kneading stages satisfy a kneading index as represented by formula (1) below within a range of 0.1 to 0.7.

Kneading index=$(a1/A) \times (t1/T)$              (1)

2 Claims, 2 Drawing Sheets

(51) Int. Cl.
  *B28B 3/20* (2006.01)
  *C21B 13/12* (2006.01)
  *C04B 40/00* (2006.01)
  *C04B 35/00* (2006.01)
  *B28B 3/00* (2006.01)
  *C21B 13/00* (2006.01)

(56) References Cited

U.S. PATENT DOCUMENTS

| 10,076,855 B2 * | 9/2018 | Mio | H01M 4/04 |
| 2008/0003167 A1 | 1/2008 | Miller et al. | |

FOREIGN PATENT DOCUMENTS

| JP | 63-74961 A | | 4/1988 | | |
| JP | H-05238716 A | * | 2/1992 | | C01B 31/02 |
| JP | 5-28998 A | | 2/1993 | | |
| JP | H0528998 | * | 2/1993 | | |
| JP | 5-139833 A | | 6/1993 | | |
| JP | 5-238716 A | | 9/1993 | | |
| JP | 2009-542842 A | | 12/2009 | | |
| JP | 2014-181168 A | | 9/2014 | | |
| KR | 2014/0116019 | * | 1/2014 | | C01B 32/205 |
| KR | 10-1601401 B1 | | 3/2016 | | |

OTHER PUBLICATIONS

Indian Oil Corp. Needle Coke Technology. Oct. 8, 2014, web.archive.org/web/20141008101431/www.iocl.com/Aboutus/RND/N_1.pdf. (Year: 2014).*

Luo, He-Ming, et al. "Preparation and Electrochemical Properties of Coke Powder Activated Carbon Based Electrode Materials." Journal of Materials Science: Materials in Electronics, vol. 24, No. 2, 2012, pp. 586-593., doi:10.1007/s10854-012-0838-y. (Year: 2012).*
Dollimore, D., and A. Turner. "Kinetics of Oxidation of ?- and ?-Resin Extracts from Coal Tar Pitch." Transactions of the Faraday Society, vol. 66, 1970, p. 2655., doi:10.1039/tf9706602655. (Year: 1970).*
"Kneading." Wikipedia, the Free Encyclopedia, Jan. 22, 2016, web.archive.org/web/20160122210254/en.wikipedia.org/wiki/Kneading. (Year: 2016).*
"Glossary." Ceramics for Beginners: Handbuilding, by Shay Amber, Lark, 2009, pp. 124-125. (Year: 2009).*
JPH-05,238,716-A (Yoichi) Feb. 1992 (online machine translation), [Retrieved on Mar. 5, 2021]. Retrieved from: Espacenet (Year: 1992).*
"Petroleum Coke." Wikipedia, Wikimedia Foundation, Jan. 15, 2016, web.archive.org/web/20160413134247/en.wikipedia.org/wiki/Petroleum_coke. (Year: 2016).*
KR-2014/0116019 (Masataka) Jan. 2014 (online machine translation), [Retrieved on Nov. 19, 2021]. Retrieved from: Espacenet (Year: 2014).*
International Search Report for the Application No. PCT/JP2017/010573 dated May 30, 2017.
English Translation of the International Preliminary Report on Patentability (PCT/IPEA/409) for the Application No. PCT/JP2017/010573 dated Sep. 20, 2018.
Supplementary European Search Report for the Application No. EP 17 766 765.6 dated Nov. 7, 2019.
Official Communication dated Oct. 6, 2020, issued for the corresponding EP Patent application No. 17766765.6.

* cited by examiner

[Fig. 1]
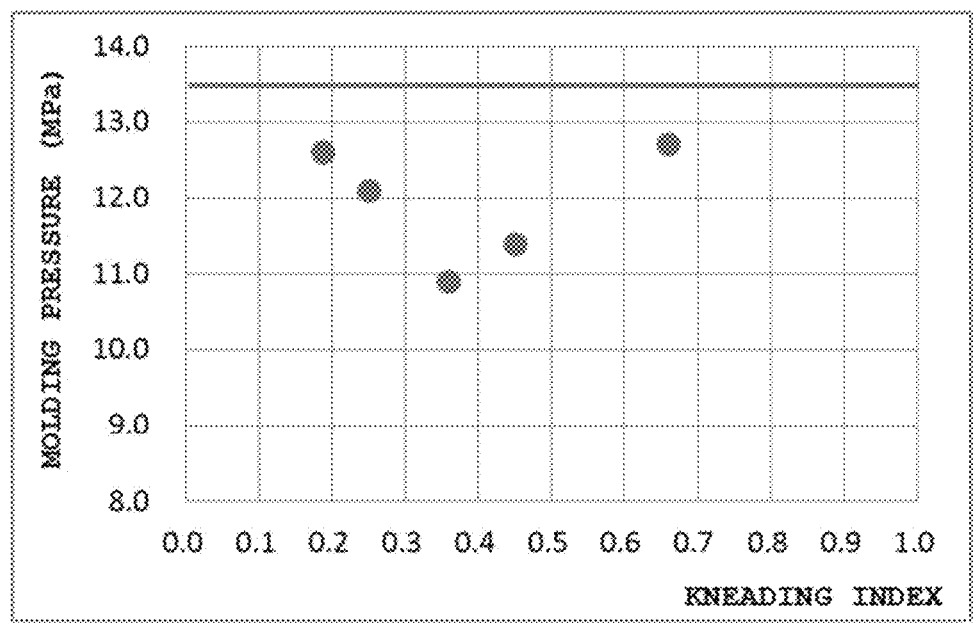
[Fig. 2]
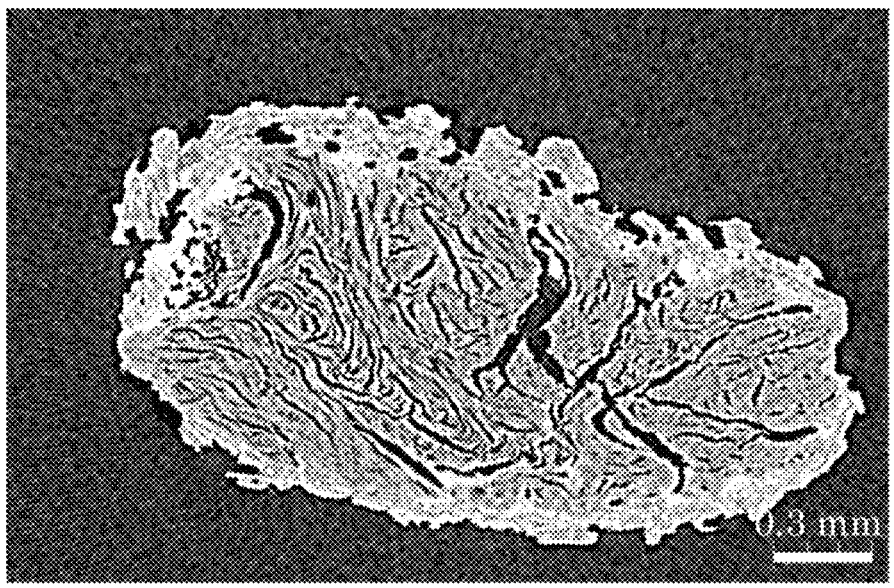

[Fig. 3]
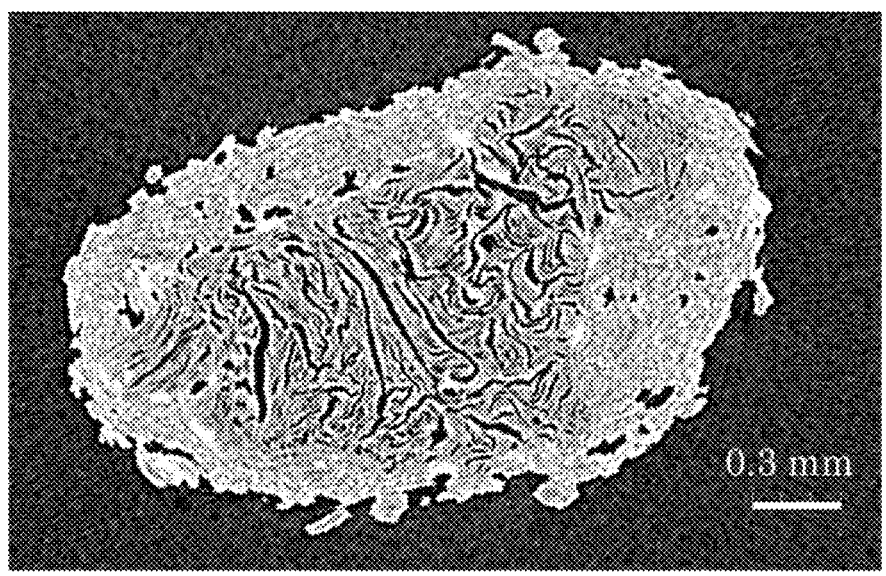

METHOD FOR MANUFACTURING ARTIFICIAL GRAPHITE ELECTRODE

TECHNICAL FIELD

The present invention relates to a method for producing an artificial graphite electrode, and more particularly, to a method for producing an electrode for electric furnace steel used when producing electric furnace steel by electric furnace steelmaking.

BACKGROUND ART

Artificial graphite electrodes use coal tar-based or petroleum-based needle coke as aggregate which is then hardened with a binder in the form of binder pitch, and are widely used as electrodes for electric furnace steelmaking. These artificial graphite electrodes are produced by crushing needle coke to adjust to a prescribed particle size followed by mixing (kneading) with binder pitch and then performing extrusion molding and performing baking and graphitization process on the same. Furthermore, graphitization process may be carried out following baking process after having impregnated with impregnation pitch and performing secondary baking process as necessary.

During production of artificial graphite electrodes, the process for kneading the needle coke and binder pitch is an important process that has an effect on various performance parameters of the artificial graphite electrode, such as the coefficient of thermal expansion (CTE) or irreversible swelling phenomena (puffing) during graphitization. This kneading process is carried out with a kneader at a temperature equal to or higher than the softening point of the binder pitch. In the subsequent baking process, extrusion rate is maintained at a constant rate by adjusting the amount of binder pitch added during kneading or adjusting the molding pressure in the extrusion process in order to maintain electrode quality and productivity at prescribed levels.

The amount of binder pitch used is related to the pore volume of the needle coke, and a larger amount of binder pitch is required the larger the pore volume of the needle coke. The amount of binder pitch used is also related to the extrusion molding process following kneading with a kneader, and in order to extrude at a constant extrusion rate, it is necessary to increase the amount of binder pitch in the case the needle coke has a large pore volume. Consequently, in the case of needle coke having a large pore volume, molding cannot be carried out unless the molding pressure is increased in order to ensure adequate kneading with the increase amount of binder pitch, and this may not be possible as a result of exceeding the limits of the extrusion molding equipment depending on the capacity thereof. A large amount of volatile components are also formed from the large amount of binder pitch used during baking, possibly resulting in cracking of the electrode.

PTL 1 discloses that finely crushed coal tar pitch (secondary binder) having a softening point of 150° C. or higher and fixed carbon content of 65% to 75% is preliminary mixed as a portion of the binder component with needle coke, and this mixture is then subjected to extrusion molding, after having kneaded with coal tar pitch (permanent binder) having a softening point of 85° C. to 105° C. and fixed carbon content of 55% to 65% serving as the remainder of the binder component, followed by carrying out baking and graphitization process in accordance with ordinary methods. In this case, it is essential that the secondary binder, having a softening point of 150° C. or higher that differs from that of the permanent binder, be mixed in advance.

PTL 2 discloses a method for producing a graphite electrode that uses petroleum-based needle coke having a real density of 2.150 g/cm3 or higher obtained by calcining at 1500° C. to 1700° C. instead of using a large amount of binder pitch, wherein binder pitch having a softening point of 100° C. to 150° C. is used for the binder. In this case, binder pitch having a higher than normal softening point of 100° C. to 150° C. is essential for use as the binder pitch, and the needle coke also has a high calcination temperature.

CITATION LIST

Patent Literature

[PTL 1] Japanese Patent Application Publication No. S63-74961
[PTL 2] Japanese Patent Application Publication No. H05-28998

SUMMARY OF INVENTION

As has been described above, in the case of using needle coke having a large number of pores in a method for producing an artificial graphite electrode, extrusion molding cannot be carried out unless the molding pressure is increased or the amount of binder pitch used is increased in order to achieve a constant molding rate during extrusion molding. In addition, when the amount of binder pitch used is increased, a larger amount of volatile components is produced at the temperature at which the binder pitch carbonizes during baking, thereby resulting in cracking of the electrode or decreased bulk density.

Therefore, the present invention provides a method for producing an artificial graphite electrode that enables kneading and subsequent extrusion molding without having to increase the amount of binder pitch used even in the case of needle coke having a large pore volume.

As a result of conducting extensive studies to solve the above-mentioned problem, the inventors of the present invention found that by having a process for kneading binder pitch with needle coke including at least two separate kneading stages and setting the amount of binder pitch added during these kneading stages to be within a prescribed range, the above-mentioned problems can be solved, thereby leading to completion of the present invention.

Namely, the present invention is a method for producing an artificial graphite electrode by kneading binder pitch with needle coke, and then performing extrusion molding and performing baking and graphitization process on the same, wherein a process for kneading the binder pitch with needle coke includes at least two separate kneading stages, and the amount of binder pitch added and kneading time in these kneading stages satisfy a kneading index as represented by formula (1) below within a range of 0.1 to 0.7.

$$\text{Kneading index} = (a1/A) \times (t1/T) \tag{1}$$

Here, A indicates a total amount of binder pitch used in the kneading process, and a1 indicates the amount of binder pitch used in the first kneading stage. T indicates a total kneading time of the kneading process, and t1 indicates the kneading time of the first kneading stage.

Furthermore, the amount of binder pitch used (parts by weight; hereinafter referred to as 'pts') (non-inclusive) is the amount based on 100 pts of the amount of needle coke used.

In the above-mentioned production method, the needle coke preferably has a real density of 2.00 g/cm3 or higher and pore volume of 0.10 cc/g to 0.30 cc/g over a pore diameter of 0.01 μm to 120 μm.

In this case, pore physical properties are measured by mercury porosimetry using a coke particle size of 2 mm to 5 mm, and the measurement conditions thereof consist of a contact angle between the mercury and needle coke of 141.2° and mercury surface tension of 480 dyn/cm.

In the above-mentioned production method, the binder pitch preferably has a softening point of 70° C. to 150° C. and β-resin content of 15 wt % to 30 wt %.

In this case, the β-resin content is measured according to the solvent analysis method of JIS K2425, and indicates the difference between toluene-insoluble components and quinoline-soluble components.

According to the present invention, kneading and subsequent extrusion molding are possible without having to increase the amount of binder pitch used even in the case of needle coke having a large number of pores. Electrode quality and productivity can be maintained a prescribed levels since the extrusion rate during the extrusion molding process can be maintained at a constant rate. Consequently, in the case of making the pressure of the extrusion molding process to be the same as that of conventional levels, extrusion molding is possible even if the amount of binder pitch used is lower than the normal amount. On the other hand, since it is not necessary to increase the amount of binder pitch used, the pressure in the extrusion molding process can be lowered, thereby making it possible to contribute to considerable energy savings.

Furthermore, various performance parameters of the artificial graphite electrode obtained according to the production method of the present invention, such as bulk density, coefficient of thermal expansion or puffing, are either comparable to or better than those in the case of having produced an artificial graphite electrode according to a conventional method.

BRIEF DESCRIPTION OF DRAWINGS

FIG. 1 is a graph indicating the relationship between kneading index and molding pressure in an example of the present invention.

FIG. 2 is a CT tomographic image of a kneaded particle of Example 1.

FIG. 3 is a CT tomographic image of a kneaded particle of Comparative Example 1.

DESCRIPTION OF EMBODIMENTS

In the production method of the present invention, in the process for kneading binder pitch with needle coke, the binder pitch is added by dividing the number of additions over two or more times when kneading the needle coke and binder pitch. In the case of using ordinary needle coke, the upper limit of the amount of binder pitch that enables extrusion molding is 35 pts (based on a value of 100 pts of needle coke when not including the amount of binder pitch, to apply similarly hereinafter).

In the case of using needle coke having a large pore volume with a standard amount of binder pitch of 25 pts, for example, extrusion molding cannot be carried out by ordinary methods due to the absence of a constant extrusion rate unless the amount of needle coke is increased to, for example, 27 pts. In addition, it is necessary to increase molding pressure in order to achieve a constant extrusion rate using the same 25 pts of binder pitch. If a larger than normal amount of binder pitch is used to achieve a constant extrusion rate, gas is generated from the binder pitch during baking that, has a high likelihood of leading to cracking of the electrode. However, use of the present invention enables extrusion molding at an extrusion rate equal to that of the prior art after having kneaded at 25 pts of binder pitch even in the case of having used needle coke having a large pore volume.

In the kneading process, when considering the example of the case of using 25 pts of binder pitch to 100 pts of needle coke, kneading is carried out by adding 10 pts of the 25 pts of binder pitch in the first stage of kneading and kneading for a certain period of time followed by adding the remaining 15 pts in the second stage of kneading and kneading for a certain period of time. The added amount, of binder pitch and kneading time during first stage of kneading is required to be determined so that the kneading index as represented by the above-mentioned formula (1) is within the range of 0.1 to 0.7.

As a result of making the kneading index to be within this range, kneading and subsequent extrusion molding are possible without having to increase the amount of binder pitch used even in the case of needle coke having a large pore volume. Although the mechanism thereof is unclear, in addition to volatile components being dissipated due to the first stage of kneading, the viscosity of the binder pitch increases and a solidified layer of binder pitch is formed on the pore surfaces (shallow portions). Consequently, binder pitch added starting in the second stage of kneading accumulates on the pore surfaces due to the solidified layer of binder pitch formed in the first stage of kneading without penetrating to the deeper portions of the pores. In addition, binder pitch that has accumulated on the pore surfaces is able to act as a lubricant during extrusion molding. Accordingly, even in the case of needle coke having a large pore volume, subsequent extrusion molding can be carried out without having to increase the amount of binder pitch used.

In the case the kneading index is less than 0.1, the kneaded state formed between the needle coke and binder pitch in the first stage of kneading is inadequate due to an insufficient amount of binder pitch added during the first stage of molding and the shortened kneading time. If the kneading index exceeds 0.7, there is no difference in molding pressure in the case of having the entire amount of binder pitch in a single round of kneading as in ordinary methods, thereby making this ineffective. Thus, the kneading index is preferably within the range of 0.15 to 0.70 and more preferably within the range of 0.20 to 0.50.

Here, the use of at least, two separate kneading stages means that the addition of pitch binder is carried out in two or more stages, and operation of a kneader or other kneading equipment may be continuous or the binding pitch may be added after temporarily discontinuing kneading. The kneading time during the first stage of kneading is preferably 5 minutes or more and the kneading time during the second stage of kneading is preferably 3 minutes or more.

The second stage of kneading is carried out after the first stage of kneading. During the second stage of kneading, the amount of binder pitch used relative to needle coke may foe the amount of binder pitch remaining after having subtracted the amount of binder pitch used in the first stage of kneading, and the kneading time may also be the amount of time remaining after having subtracted the kneading time of the first stage of kneading. Namely, it is not necessary to greatly change the overall amount of binder used, and kneading time. Furthermore, multiple stages of kneading, such as a third stage of kneading, can be added beyond the second stage of kneading as necessary. In the case of providing three or more kneading stages, the used amount of binder pitch and kneading time can be reduced in the second stage of kneading.

There are no particular limitations on the needle coke used, and coal-based needle coke or petroleum-based needle coke can be used. The present invention is effective in cases of using needle coke having a larger amount of pores (pore volume) than normal. The use of needle coke having a large amount of pores (pore volume) is advantageous for inhibiting puffing.

The pore volume of the needle coke indicates the volume measured by mercury porosimetry using a coke particle size of 2 mm to 5 mm, and pore volume for a pore diameter of 0.01 µm first to 120 µm is preferably 0.10 cc/g to 0.30 cc/g, more preferably 0.10 cc/g to 0.25 cc/g, and even more preferably 0.13 cc/g to 0.20 cc/g. In this case, pore diameter is calculated using the contact angle between the mercury and needle coke of 141.2° and mercury surface tension of 480 dyn/cm. In the case pore volume is less than 0.10 cc/g, the effect demonstrated by the present, invention is low due to the low pore volume. In the case pore volume exceeds 0.30 cc/g, the amount of binder pitch required becomes excessively large, resulting in inferior eligibility as needle coke for the production of a graphite electrode.

The softening point of the binder pitch used as binder is preferably 70° C. to 150° C. and the β-resin content is preferably 15% to 30%. If the softening point is lower than 70° C., viscosity becomes excessively low preventing the binder pitch from penetrating to the deepest portions of the needle coke pores, and thereby preventing the effects of the present invention from being adequately demonstrated. If the softening point exceeds 150° C., the temperature of the kneader used for kneading must be raised to forcibly lower the viscosity of the binder pitch, which is disadvantageous in terms of production efficiency. The softening point is more preferably 80° C. to 130° C. and particularly preferably 90° C. to 120° C.

The same type of binder pitch, such as that having the same softening point, may be kneaded in two separate kneading stages, or different kinds of binder pitch, such as those having different softening points, may be kneaded in a first stage of kneading and a second stage of kneading. The pore diameter of the needle coke in which the binder pitch enters or the amount of binder pitch that enters the needle coke can be adjusted by changing the softening point of the binder pitch, such as by kneading using a binder pitch having a high softening point in the first stage of kneading and using a binder pitch having a low softening point in the second stage of kneading.

EXAMPLES

Although the following provides a more detailed explanation of the present invention through examples and comparative examples thereof, the present invention is not limited to these examples.

Example 1

Coal tar-based needle coke having a real density of 2.15 g/cm3 and pore volume as measured with a mercury porosimeter of 0.136 cc/g was used for the needle coke. This needle coke was crushed with a jaw crusher and passed through a 8 to 16 mesh (Me') sieve followed by mixing the material on and below the sieve, crushing with a hammer crusher and sieving to sizes of 48 Me' to 200 Me and 200 Me' or smaller. After combining each particle size distribution at 40% (8 Me' to 16 Me'), 35% (48 Me' to 200 Me') and 25% (200 Me or smaller) in order of increasing particle diameter, this needle coke was kneaded with binder pitch (BP) in two stages. The binder pitch used had a softening point of 97° C. and β-resin content of 20%. In other words, 25 pts of the total amount of binder pitch used was incorporated based on 100 pts of the needle coke in terms of the kneading process, and kneading was carried out for 20 minutes at 160° C. In this kneading process, 12.5 pts of the amount of binder pitch was incorporated in the first stage of kneading followed by kneading for 7.5 minutes, after which the remaining 12.5 pts was incorporated in the second stage of kneading while maintaining the same temperature followed by additionally kneading for 12.5 minutes. The kneading index in this case was 0.19.

Following kneading, molding pressure was adjusted to a constant extrusion rate of 7 cm/min with an extruder and that pressure was used for the extrusion pressure. In addition, as for CTE a sample for measurement of CTE was obtained by extrusion molding to a size of 20 mmφ×100 mm followed by baking at 900° C. and then graphitizing at 2500° C. CTE was measured by measuring the average coefficient of thermal expansion over the range from room temperature to 500° C.

The results are shown in Table 1.

Examples 2 to 5

Graphite electrodes were produced in the same manner as Example 1 with the exception of changing the kneading conditions and molding conditions to those shown in Table 1. The results are similarly shown in Table 1.

Comparative Example 1

A graphite electrode was produced in the same manner as the examples with the exception of molding after having kneaded by incorporating the entire 25 pts of binder pitch all at once instead of dividing kneading of the binder pitch and kneader coke into two stages as in conventional methods. The results are also similarly shown in Table 1.

The relationship between kneading index and molding pressure is collectively shown for Examples 1 to 5 in FIG. 1. Furthermore, values are shown using the value of molding pressure of Comparative Example 1 (13.5 MPa) for the base line.

Mixed particles having a diameter of 1 mm to 2 mm were sampled from the kneaded products of Example 1 and Comparative Example 1 and computed tomography was carried out at a resolution of 3 µm using an X-ray CT system (TUX-3200N, Mars Tohken Solution Co., Ltd.) followed by reconstructing into 3D images. Tomographic images were obtained from random cross-sections of the reconstructed 3D images. A typical tomographic image of Example 1 is shown in FIG. 2, while a typical tomographic image of Comparative Example 1 is shown in FIG. 3. In contrast to the thickness of the binder pitch distributed around the needle coke being substantially uniform in FIG. 2, the thickness of the binder pitch is not uniform in FIG. 3.

TABLE 1

|  | Total amt. of BP (pts) | First stage kneading | | Second stage kneading | | Kneading index | Molding pressure (MPa) | CTE ($\times 10^{-6}$/° C.) |
|---|---|---|---|---|---|---|---|---|
|  |  | Amt. of BP (pts) | Time (min) | Amt. of BP (pts) | Time (min) |  |  |  |
| Comp. Ex. 1 | 25 | 25 | 20 | | | 1.00 | 13.5 | 1.29 |
| Ex. 1 | 25 | 12.5 | 7.5 | 12.5 | 12.5 | 0.19 | 12.6 | 1.28 |
| Ex. 2 | 25 | 12.5 | 10 | 12.5 | 10 | 0.25 | 12.1 | 1.23 |
| Ex. 3 | 25 | 15 | 15 | 10 | 5 | 0.45 | 11.4 | 1.23 |
| Ex. 4 | 25 | 18 | 10 | 7 | 10 | 0.36 | 10.9 | 1.22 |
| Ex. 5 | 25 | 22 | 15 | 3 | 5 | 0.66 | 12.7 | 1.28 |

INDUSTRIAL APPLICABILITY

According to the production method of the present invention, electrode quality and productivity can be maintained at prescribed levels without having to increase the amount of pitch binder used even in the case of needle coke having a large number of pores, contributions can be made to considerable energy savings and the resulting artificial graphite electrode demonstrates superior coefficient of thermal expansion, puffing and other performance parameters, thereby making the resulting electrode useful as an electrode for electric furnace steelmaking when producing electric furnace steel by electric furnace steelmaking.

The invention claimed is:

1. A method for producing an artificial graphite electrode, the method comprising:
kneading binder pitch with needle coke, and
then performing extrusion molding and then performing baking and graphitization treatment on the same, wherein
the needle coke has a real density of 2.00 g/cm$^3$ or higher, a pore volume of the needle coke for a pore diameter of 0.01 µm to 120 µm is 0.10 cc/g to 0.30 cc/g,
kneading the binder pitch with needle coke includes at least two separate kneading stages with the addition of binder pitch being carried out in two or three stages, and
the amount of binder pitch added and kneading time in these kneading stages satisfy a kneading index as represented by formula (1) below within a range of 0.25 to 0.60:

$$\text{Kneading index} = (a1/A) \times (t1/T) \quad (1)$$

where, A indicates a total amount of binder pitch used in the kneading process, a1 indicates the amount of binder pitch used in the first kneading stage, T indicates a total kneading time of the kneading process and t1 indicates the kneading time of the first kneading stage.

2. The method for producing an artificial graphite electrode according to claim 1, wherein the binder pitch has a softening point of 70° C. to 150° C. and a β-resin content of 15 wt % to 30 wt %.

* * * * *